T. L. FAWICK.
ADJUSTING MEANS FOR FRICTION CLUTCHES.
APPLICATION FILED MAR. 4, 1918.
1,390,352.
Patented Sept. 13, 1921.
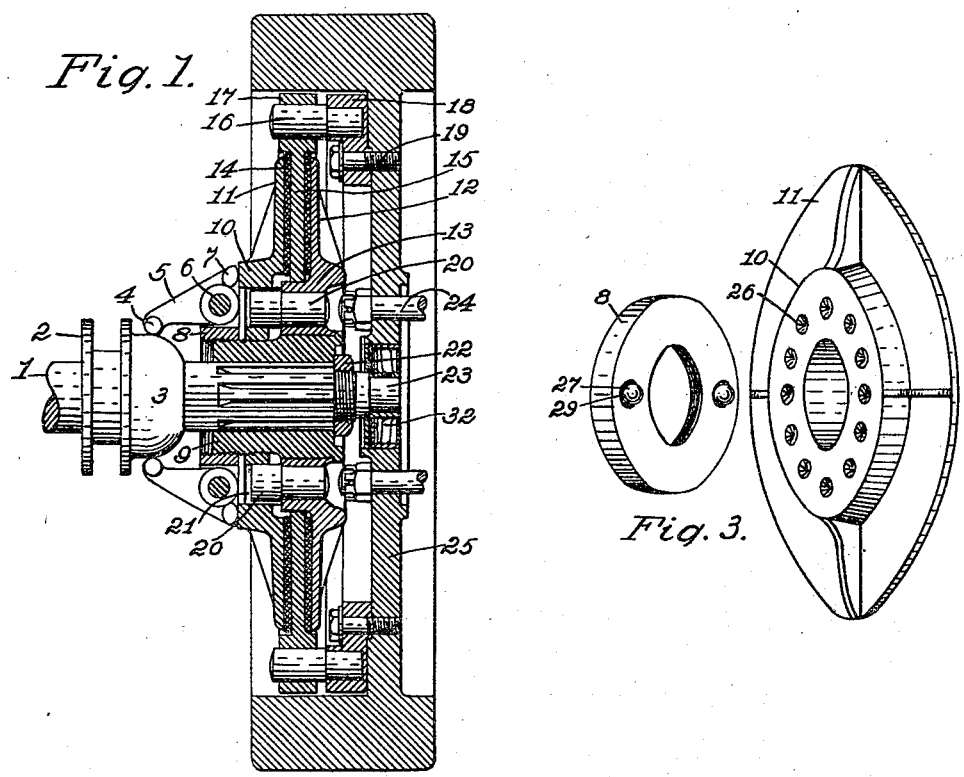
Fig. 1.
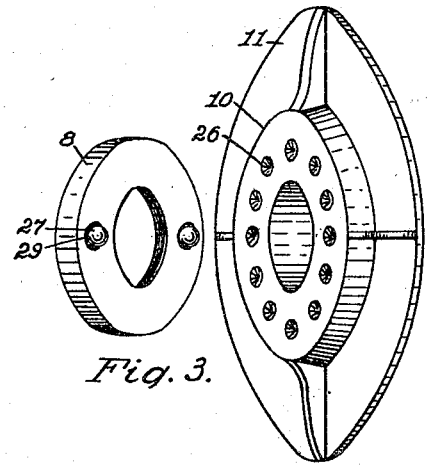
Fig. 3.
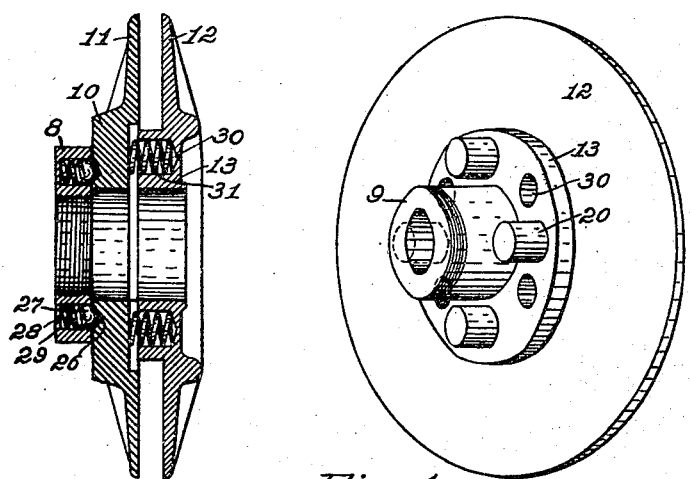
Fig. 2.
Fig. 4.
INVENTOR.
T. L. Fawick,
BY
ATTORNEY.

UNITED STATES PATENT OFFICE.

THOMAS L. FAWICK, OF CHICAGO, ILLINOIS, ASSIGNOR TO TWIN DISC CLUTCH COMPANY, OF RACINE, WISCONSIN, A CORPORATION OF WISCONSIN.

ADJUSTING MEANS FOR FRICTION-CLUTCHES.

1,390,352.   Specification of Letters Patent.   Patented Sept. 13, 1921.

Application filed March 4, 1918. Serial No. 220,147.

*To all whom it may concern:*

Be it known that I, THOMAS L. FAWICK, a citizen of the United States of America, and a resident of Chicago, Cook county, Illinois, have invented certain new and useful Improvements in Adjusting Means for Friction-Clutches, of which the following is a specification.

My invention relates to improvements in friction clutches, and the object of my improvement is to furnish in a friction clutch adjustable means for taking up wear in parts of the clutch, combined with oppositely-acting resilient elements functioning in a desired manner on elements of the clutch to effect quick frictional engagements of the friction faces, and to as quickly act in moving them apart out of engagement when necessary in the operation of the clutch.

This object I have accomplished by the means which are hereinafter described and claimed, and which are illustrated in the accompanying drawings, in which Figure 1 is a transverse axial section of my improved friction clutch, with parts broken away; Fig. 2 is a transverse axial section of certain coacting elements of the clutch, showing the oppositely acting resilient means, and adjustable connection; Fig. 3 is a perspective view of two of the coacting elements as spread apart to show the adjusting feature thereof, and Fig. 4 is a perspective view of other elements of the clutch, showing the engaging-means thereon and spring-seats adapted for engagement with another element of the clutch.

Similar numerals of reference denote corresponding parts throughout the several views.

The numeral 25 denotes a fly-wheel adapted to be axially connected by means of bolts 24 to a power-shaft not shown or to some supporting structure thereon, to rotate therewith. The numeral 1 denotes a driven shaft alined coaxially with said fly-wheel, and having a diminished extremity 23 extending into an anti-friction bearing 32 centrally located in the web of said fly-wheel.

An internal ring 18 is secured concentrically on the web of said fly-wheel by means of the machine-screws 19 and carries fixedly mounted pins 16. On said pins is fixed another internal ring 17 which has an internal annular web 15 with its opposite outer faces flat and parallel to each other. The webbed ring 15—17 thus serves as a double-faced friction-head. On the opposite faces of the web 15 are mounted flat friction-rings 14 of any desired material. Upon the shaft 1 is keyed a sleeve 9, upon which is fixed a ring 13 having a radial flange 12 which serves as a friction abutment for the abutting frictional ring 14 on the hither side of said web 15. A sleeve 10 is loosely mounted on said sleeve 9, and is provided with an integral radial flange 11 forming a friction element adapted to be moved into frictional contact with the friction-ring 14 on the opposite side of the web 15 from the other friction-ring. Pins 20 are fixed in the ring 13 to extend into sockets 21 in said ring 10, to prevent the ring 10 from rotating on the sleeve 9 while permitting it to move to and from the adjacent friction-ring 14.

As shown best in Figs. 2 and 4, the ring 13 has sockets 30 placed intermediately between the pins 20 to receive short coiled compression springs 31 which project therefrom to engage with the opposite face of the ring 10, tending to yieldingly propel the ring 10 from the ring 13.

The outer end of the sleeve 9 is exteriorly threaded to removably receive the interiorly-threaded ring 8, the latter adapted to bear adjustingly against the outer face of said ring 10 as the ring 10 is pressed outwardly by the springs 31. The ring 8 therefore serves as an adjustable abutment for said ring 10. As best shown in Fig. 3, the ring 8 is provided with oppositely-positioned sockets 29 to receive the helical compression-springs 28. Anti-friction balls 27 are held in the free extremities of said springs, and are received in oppositely positioned shallow conical bearing sockets 26 in said ring 10. A plurality of pairs of said sockets 26 are provided spaced equally around the ring 10, to permit of a number of adjustments in each turn of the ring-nut 8 relative to said ring 10. The balls 27 in entering the sockets 26 lock the ring-nut in an adjusted position.

Upon said ring-nut 8 are paired lugs connected by pintles 6 on which are pivotally mounted the levers 5, the short arms of which have curved bossed extremities 7 adapted to movably engage the abutting faces of the ring 10. Upon the ends of the longer arms of said levers are bosses 4 adapted to contact slidably with the convex abutting end of a sleeve 3 having a grooved annular trough with flanges 2 to receive members of a shifting-arm (not shown) to shift said sleeve longitudinally to and fro on the shaft 1 to act upon the levers 5 to push their extremities 7 against the hub of the ring 10 to compress the friction-rim 11 thereof against the friction-face 14 and the other friction-face 14 against the friction-abutment rim 12, to thereby engage the said parts together to drive the shaft 1.

When the sleeve 3 is shifted in a reverse direction, the lever-ends release the rings 10, so that the quick reaction of the relatively strong helical springs 31 disengage the said friction surfaces of the parts 11, 15 and 12, the part 15 having a sliding fit on the pins 16. The helical springs 28 are of less strength than the springs 31, so are compressed somewhat when the springs 31 thrust the ring 10 outwardly, and are thus kept in tension to hold the ring-nut in its adjusted position on the ring 10, preventing the balls 27 from escaping from the ring-sockets 26. The ring-nut 8 can be manually turned for adjustment to take up for wear of the parts, the balls 27 passing into another pair of sockets 26. It will be seen that the arrangement of the frictionally-contacting parts of my clutch, with the co-acting springs is such, that engagement is rapidly effected, and disengagement as quickly made, while the springs afford a yielding engagement suitable for the purposes of the clutch, and the adjustable ring-nut permits taking up for wear to prevent lost motion and to keep the parts in true alinement and working efficiency in their relations.

Having described my invention, what I claim as new, and desire to secure by Letters Patent, is:

1. In a friction clutch, a rotatable driven element, a rotatable driving element including a friction-head slidably non-rotatably connected thereto, a friction-abutment fixed on said driven element adjacent one friction-face of said friction-head, a friction-element slidably non-rotatably mounted on said driven-element, movable into contact with the opposite face of said friction-head, and separate tension-producing means of different powers bearing against opposite parts of said friction-element.

2. In a friction clutch, a rotatable driving element, said driving element including a longitudinally movable non-rotatable friction-head having opposite friction faces, a friction-abutment fixed on a driven element to contact with the adjacent friction-face of said friction-head, a driven element, a friction-element slidably non-rotatably mounted on said driven element and movable into contact with the opposite friction-face of said friction-head to compress it frictionally against the said friction-abutment, yieldable resilient means engaged between said fixed friction-abutment and said slidable friction-element tending to thrust them apart, an abutment adjustably mounted on said driven element, means spaced equidistant about the driven element for controlling adjustment of said abutment axially of the driven element, and yieldable resilient means of less power than the first-mentioned resilient means engaged between said abutment and said slidable friction-element.

Signed at Waterloo, Iowa, this 13th day of Feb., 1918.

THOMAS L. FAWICK.